(12) United States Patent
Ramic et al.

(10) Patent No.: US 8,477,942 B2
(45) Date of Patent: Jul. 2, 2013

(54) METHOD AND APPARATUS FOR MANAGING SERVICE LISTS

(75) Inventors: Haris Ramic, Chicago, IL (US); Arthur E. Paton, Schaumburg, IL (US); Thomas M. Tirpak, Glenview, IL (US)

(73) Assignee: Motorola Mobility LLC, Libertyville, IL (US)

( * ) Notice: Subject to any disclaimer, the term of this patent is extended or adjusted under 35 U.S.C. 154(b) by 554 days.

(21) Appl. No.: 12/254,938

(22) Filed: Oct. 21, 2008

(65) Prior Publication Data

US 2010/0100938 A1   Apr. 22, 2010

(51) Int. Cl.
 *H04K 1/00* (2006.01)
(52) U.S. Cl.
 USPC ............................... 380/270; 726/4; 455/410
(58) Field of Classification Search
 USPC ................. 380/270; 726/4; 455/410
 See application file for complete search history.

(56) References Cited

U.S. PATENT DOCUMENTS

| 5,706,330 | A | 1/1998 | Bufferd et al. |
| 6,018,570 | A * | 1/2000 | Matison .................. 379/207.15 |
| 6,031,904 | A * | 2/2000 | An et al. .................. 379/201.02 |
| 6,329,924 | B1 * | 12/2001 | McNulty ...................... 340/660 |
| 6,532,368 | B1 | 3/2003 | Hild et al. |
| 6,622,016 | B1 * | 9/2003 | Sladek et al. ............. 455/414.1 |
| 6,675,002 | B1 * | 1/2004 | Lipovski .................... 455/194.1 |
| 7,039,591 | B2 | 5/2006 | Ecklund et al. |
| 7,062,269 | B2 * | 6/2006 | Albertsson et al. ......... 455/432.1 |
| 7,142,877 | B2 * | 11/2006 | Lipovski .................... 455/456.4 |
| 7,197,125 | B1 * | 3/2007 | Prasad et al. ............. 379/201.02 |
| 7,317,699 | B2 * | 1/2008 | Godfrey et al. ............... 370/328 |
| 7,363,042 | B2 * | 4/2008 | Lipovski .................... 455/456.4 |
| 7,464,148 | B1 * | 12/2008 | Filho et al. ..................... 709/223 |
| 7,606,918 | B2 * | 10/2009 | Holzman et al. ............. 709/229 |
| 7,646,881 | B2 | 1/2010 | Zarrabizadeh |
| 7,818,741 | B1 * | 10/2010 | Bourdev ....................... 717/174 |
| 2003/0046189 | A1 * | 3/2003 | Asayama ........................ 705/27 |
| 2003/0144003 | A1 | 7/2003 | Ranta et al. |
| 2004/0078812 | A1 | 4/2004 | Calvert |
| 2004/0087318 | A1 * | 5/2004 | Lipovski .................... 455/456.4 |
| 2004/0176958 | A1 * | 9/2004 | Salmenkaita et al. ........ 704/275 |
| 2005/0074018 | A1 | 4/2005 | Zintel et al. |

(Continued)

FOREIGN PATENT DOCUMENTS

| EP | 1188311 B1 | 3/2003 |
| WO | 9524011 | 9/1995 |
| WO | 2005051019 A1 | 6/2005 |

OTHER PUBLICATIONS

Data Services: Get It Now® —Verizon Wireless Support, extracted from URL: http:/lsupport.vzw.com/features/data_services/get_it_now.html, Oct. 8, 2006, pp. 1-2.

(Continued)

Primary Examiner — April Y Blair

(57) ABSTRACT

A method and apparatus for managing service lists receives a service list and a security layer identifier at a device. The service list comprises at least two service identifiers. The method and apparatus determines whether the security layer is authorized for the device, and, for each service identified in the service list, when the security layer is authorized for the device the method and apparatus acquires each service in the service list that is not already installed in the device and enables each service in the service list that is not already enabled in the device.

10 Claims, 5 Drawing Sheets

U.S. PATENT DOCUMENTS

| | | |
|---|---|---|
| 2005/0239447 A1* | 10/2005 | Holzman et al. ............ 455/414.3 |
| 2005/0266879 A1 | 12/2005 | Spaur et al. |
| 2006/0121879 A1 | 6/2006 | Tseitlin et al. |
| 2006/0148490 A1* | 7/2006 | Bates et al. ................. 455/456.1 |
| 2006/0190601 A1* | 8/2006 | Lee et al. ........................ 709/225 |
| 2007/0105589 A1* | 5/2007 | Lu ............................... 455/556.2 |
| 2007/0118507 A1 | 5/2007 | Bruner |
| 2007/0142038 A1* | 6/2007 | Shamanna ................. 455/414.1 |
| 2007/0189279 A1* | 8/2007 | Thalanany et al. ............ 370/356 |
| 2007/0202886 A1* | 8/2007 | Dhebri et al. .............. 455/456.1 |
| 2008/0141294 A1* | 6/2008 | Leichter et al. ................. 725/28 |
| 2008/0231750 A1* | 9/2008 | Suzuki ........................... 348/563 |
| 2008/0237337 A1 | 10/2008 | Drackett et al. |

OTHER PUBLICATIONS

Answers to FAQs—Verizon Wireless Support, extracted from URL: http://support.vzw.com/faqs/Get%20IT%20Now/faq.html#item5, Oct. 8, 2008, pp. 1-9.

\* cited by examiner

METHOD AND APPARATUS FOR MANAGING SERVICE LISTS

FIELD OF THE DISCLOSURE

The present disclosure relates generally to communication systems and, more particularly, to the management of services available to client devices in a communication system.

BACKGROUND

Client devices in present day communication systems provide a variety of services to their users. For wireless client devices such as cellular telephones, these may include services such as web browsers, direct access to certain web sites, phone calling, push-to-talk (PTT) broadcast calling, point to point calling, online contact list management, etc. When a new cellular phone is obtained by a user in a consumer oriented cellular communication system, a set of services is typically enabled that is selected as a package that has a particular monthly charge. The set of services is typically a subset of services that are installed in the cellular phone before the user obtains the phone. The set of services is provided to the user by the service provider, who enables those to which the user subscribes, e.g., those for which he/she pays. Subsequent to the initial provisioning of the device, services may then be added or deleted by the user, either by the service provider enabling or disabling services that are already installed in the phone, or by the user downloading a service on an individual basis. In most client devices of cellular or other non-consumer types, there may be a list of some or all of the available services. In enterprise or government systems, the set of services that the user can use may be tightly controlled by the system operator. For example, a public safety agency may have a specified set of services related to the type of job the user does, and the agency may prevent the user by policy from using any but the specified set of services, or certain types of services (i.e., no games allowed).

In present day client devices, the acquisition of the set of services installed in the device is generally accomplished by their inclusion in a software package that is locally installed into the client device before it is made available to the user. In the case of many different types of systems, this may be a package that is installed by the client device manufacturer. The set of services is then typically managed by enabling or disabling individual services or by downloading a service map of services that can be accessed by a particular client device, and their appearance in the user interface. Enabling a service may be preceded by downloading some software that provides the service when it is not in the client device. However, when a set of services needs to be provided to a set of client devices that may or may not be pre-authorized to use some or all of the services, the present processes for enablement or disablement of service are inadequate.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
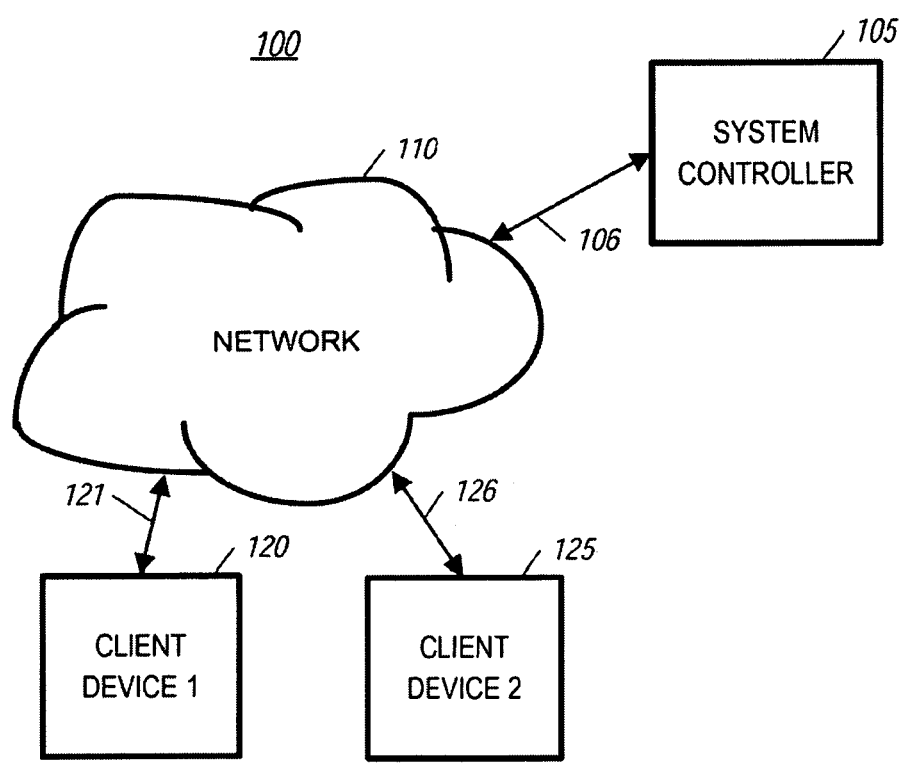
FIG. 1 is a diagram that shows a set of subscriber devices operative on a communication network, in accordance with embodiments of the invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Referring to FIG. 1, a block diagram of a communication system 100 is shown, in accordance with some of the embodiments. The communication system 100 comprises a system controller 105 that is coupled to a network 110 by a signaling means 106. The system controller 105 may comprise one or more computers, some of which may be classed as servers. The system controller 105 is coupled to one or more client devices, of which two are shown in FIG. 1, client device 120 and client device 125, that are coupled to the network 110 by signaling means 121 and signaling means 126. The network 110 may comprise a plurality of communication networks that are coupled to each other and which may be of different types. As one example, the client devices 120, 125 may have WiFi signaling means 121, 126 and the system controller 105 may have an Ethernet signaling means 106, and the network 110 comprises networking means that handles both of these types of signaling. Many other signaling and network combinations exist that are known to one of ordinary skill in the art.

In accordance with some of the embodiments, the client devices 120, 125 may comprise certain unique client functions for managing services of the client devices 120, 125 and the system controller 105 may comprise unique controller functions for managing services of the client devices 120, 125. In the broadest sense, a service of a client device is any function that manipulates information that is retained within the client device or that facilitates communication of information between a client device and an external device (either a client or a network device). An example of a service that locally manipulates information resident within the client device is a contact list, e.g., Phone Book, creation and editing function that is manipulated by user input and output. In some embodiments, a service is a function that, when invoked, either facilitates obtaining information from an external source or facilitates sending information to an external source. Examples of this type of service include a function that initiates connection of a cellular telephone in which the function has been invoked to a particular web site, a Push-To-Talk (PTT) function, and a function that provides for a new ring tone to be downloaded. As used herein, a global service is one that may be a local function (one that does not communicate information externally) or an external function (one that does communicate information externally). In some of the embodiments, the service may be restricted to a particular function that is invoked by depressing a particular button that facilitates an action. In these embodiments, one such (or the only such) button may be called a push-to-X (PTX) button and the service may be called Push-To-X (PTX) where X stands for the selected service. Some examples of PTX services are PTX to 911, PTX to License Check, and PTX to Dispatch Center. PTX functions may be global, local or external. The selection of the service provided (or initiated) by a PTX button may be accomplished, for example, using a scroll wheel and a list of functions that can be invoked by the button. It will be appreciated by one of ordinary skill in the art that a service that is successfully invoked in a client device may be initiated by a client function in a client device and completed by external functions that are resident in one or more devices external to the client device, such as another client device and/or system controller devices. It should be further appreciated that the client function (and therefore the service) may be unavailable for use because the client function is not installed ("the service is not installed" is used synonymously for this condition), or because the client function is installed but disabled ("the service is installed but disabled" is used synonymously for this condition). It should be further appreciated that a client function may be a fairly simple portion of a complex service, or may be a complete function. For example, a Push-To-Dispatch may need to send only a short message to a system controller and activate the client transmitter. The controller may then have complex functions to complete, such as setting up a call connection between the client device and one or more other clients whose identity is determined based on particular information in the short message. On the other hand, if the concept of service in some embodiments includes local entry and editing of a contact, then the client device may provide the entire function of the service. The functions that a service provides may be provided by a combination of software and hardware.

Figure 2:
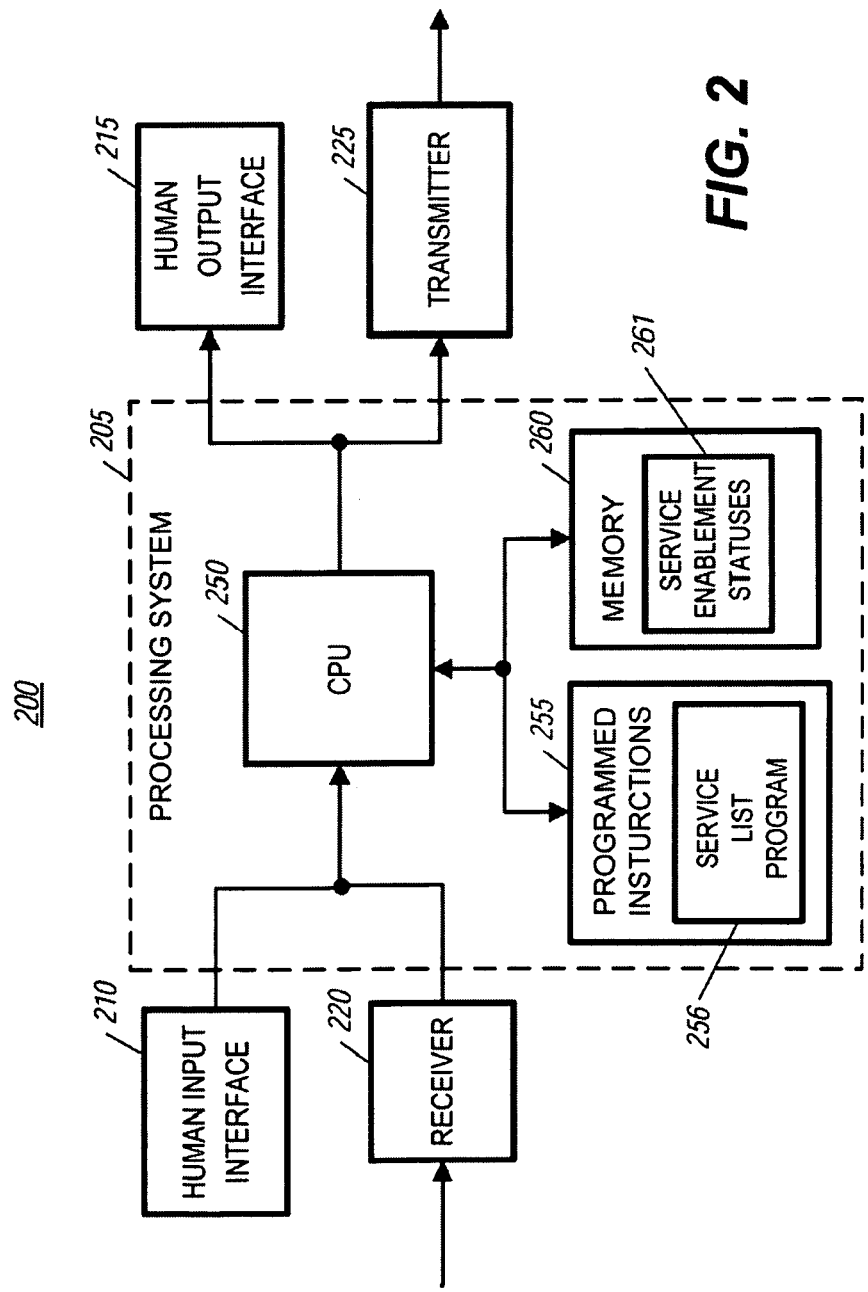
FIGS. 2 and 3 are, respectively, a functional block diagram and a flow chart of an apparatus and some steps of a method for managing service lists, in accordance with some of the embodiments.

Referring to FIG. 2, an electrical block diagram shows a client device 200 that is representative of client devices 120, 125. The client device 200 comprises a processing system 205 and the following functions coupled to the processing system 205: a human input function 210, a human output function 215, a receiver 220, and a transmitter 225. The human input and output functions 210, 215 may include one or more human input and output modalities, such as keyboard, display, microphone, speaker, and haptic modalities, each of which may include the art. The receiver and transmitter functions 220, 225 may be of any conventional type, including any radio technology such as, for example, cellular telephone technology, BLUETOOTH, WiFi, and WiMax, or a wired technology such as Ethernet, or a light technology such as optic fiber or infrared, each of which may include their own hardware drivers and modality processing units, as are well known in the art. The receiver and transmitter technologies need not be the same.

The processing system 205 comprises a central processing unit (CPU) 250 coupled to at least a programmed instructions device 255 and a memory device 260. While these devices and this coupling arrangement may be in one sense conventional, the specific instruction arrangement that is in the programmed instructions is uniquely designed to provide unique features that are described herein, and the memory device 260 stores a unique set of information that is further described herein below, that has been generated by the CPU 250 under control of the specific instruction arrangement. The specific instruction arrangement may be collectively referred to as the service list program 256 and the unique set of information may be collectively referred to as the service enablement statuses 261. The programmed instructions device 255 may comprise one or more memory circuits or media, and the memory device 260 may comprise one or more circuits or media, and the programmed instructions device 255 and memory device may use portions of one or more circuits or media. In other words, the processing system 205 runs a unique program (the service list program 256) to accomplish the functions described.

Figure 3:
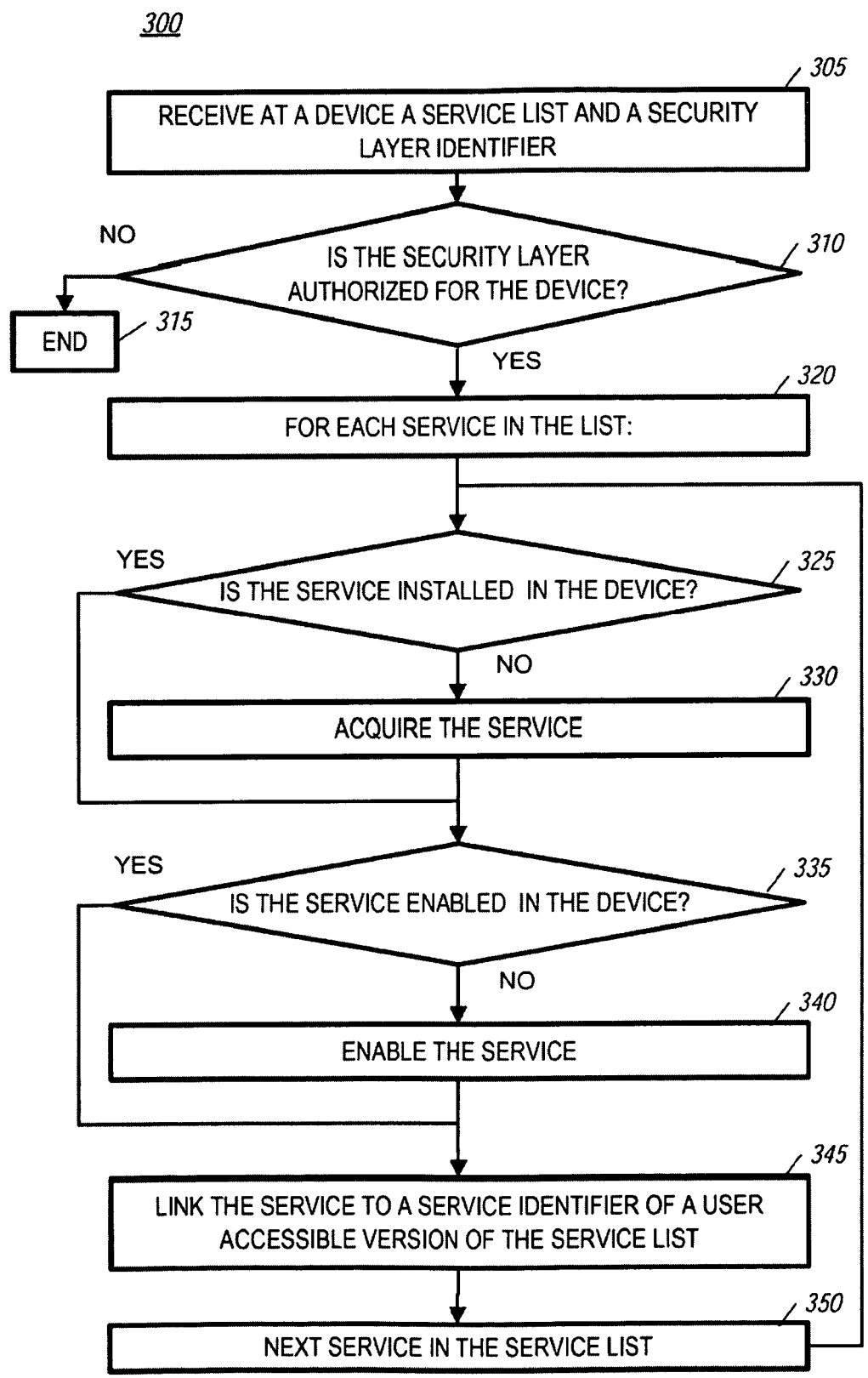

Referring to FIG. 3, a flow chart 300 shows some steps of a method for managing a service list in a client device, in accordance with certain of the embodiments. A service list, in the context of this document, is a set of service identifiers for a client device, wherein the identified services have been, or are to be, installed and which identified services may be enabled depending upon values associated with the service list globally or with each service identifier individually. A service list and certain of the associated values may be transmitted or received by the client device 200 as a received or transmitted service list. A service list and certain of the associated values may be stored in memory 260 as a stored service list. A service list and certain of the associated values may be shown on a display as a displayed service list. A displayed service list may have no associated values shown. The set of services identified in each of these types of service list is not necessarily common to other service lists of the client device at any given time. A service list typically has two or more services identified in it, but may have only one service identified in some instances. Certain values or certain combinations of values associated with a particular service list and the services identified in the service list may be used by the central processing unit 250 in combination with values stored in the client device to make a determination that a service may be invoked by a user of the client device 200, or may be automatically invoked by the client device (without user intervention) upon certain events, in which case the service is in an enabled state, or more simply, is enabled. If a determination is made that a service cannot be not used in the client device, it is a disabled service. The values associated with a service list that are used to make the determination of the enablement state for a particular service may be called an enablement indicator for the particular service, and may be stored as the service enablement statuses 261. One type of value that may be associated with a received service list is a security layer identifier, which is a global value for all the services in the service list. It may used with other values associated with services in the received service list and/or with values associated with services stored in the memory 260 to determine enablement and disablement of services within the client device 200. It will be appreciated that in certain descriptions, reference may be made directly a service "in the service list" which is equivalent to describing "a service that is identified by a service identifier in the service list"

At step 305, a service list and a security layer identifier are received at a device, wherein the service list comprises at least two service identifiers. The security layer identifier is used by the device to determine at step 310 whether the identified security layer is authorized for the device. This is done by comparing the security layer identifier to a global service security authorization value stored in the device. When the security layer is determined not to be authorized for the device at step 310, the method ends at step 315, and the enablement states of services already enabled or disabled within device are not changed. When the security layer is determined to be authorized for the device at step 310, then an analysis may be performed for each service in the service list, starting at step 320. Steps in the range from step 325 through 350 are then performed for each service in the service list. At step 325, a determination is made as to whether the service is installed in the device, i.e., the function needed to invoke the service (for example, to initiate or perform the service) is installed in the device, although it may not be enabled. If the service is not installed in the device, then the function needed to invoke the service is acquired (e.g., downloaded and installed, or perhaps just installed if it is resident but not installed) (i.e., the service is acquired) and the method continues at step 330. If the service is installed in the device, the method continues at step 330, wherein a determination is made as to whether the service is enabled in the device. If the service is not already enabled in the device, then it is enabled, and the method continues to step 345. If the service is already enabled, then the method continues at step 345, wherein the service may be linked to a service identifier of a user accessible version of the service list. (User accessible implies that a version of the service list exists that may be presented to the user and from which the user may select a service. For example, the user may select the service from the list simply to invoke the service or to select it for association with a particular button that may then be used to invoke the service.) Step 345 may further entail providing a new set of graphical user interfaces that are appropriate for the service list. Step 345 may be an optional step; for example it may not be needed when the service is one that is not listed in a user accessible version of the service list. The method continues at step 350, wherein a next service in the service list is analyzed. When all services in the service list have been analyzed using steps 325-350, this method may end.

Figure 4:
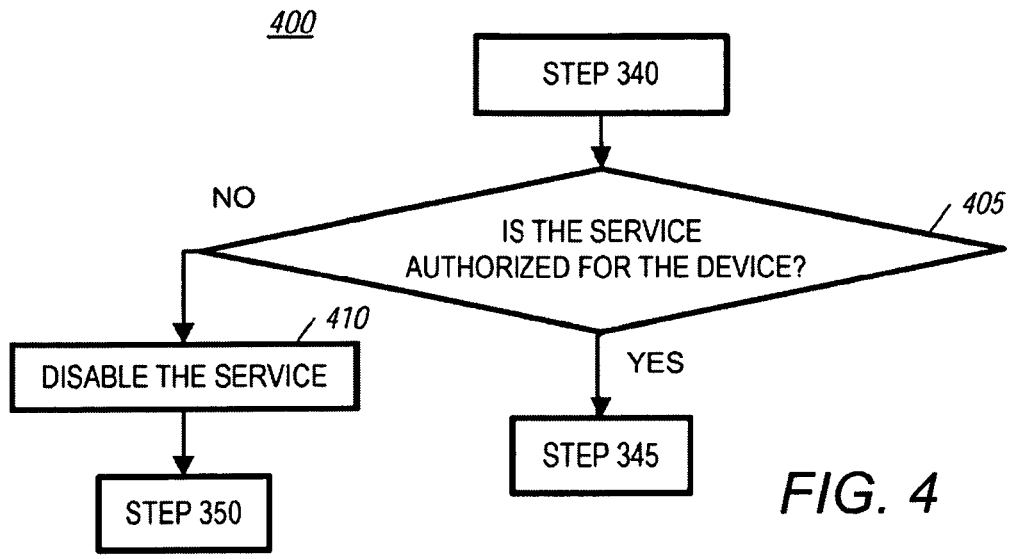
FIGS. 4-8 are flow charts that show other steps of the method for managing service lists, in accordance with some of the embodiments.

Referring to FIG. 4, a flow chart 400 shows another step of the method for managing a service list in a client device, in accordance with certain of the embodiments. This step may be optional. For example, it may be used in a client device in a consumer system. Step 405 may occur, for example, after step 340 (FIG. 3), after each service has been installed and enabled in the device (either presently or at a prior time). A determination is made at step 405 as to whether the service being evaluated is authorized for the device. If the service is not authorized for the device (for example, it is not authorized under a current payment plan for the specific device, or there does not exist appropriate rights for use of the service at the device), then the service is disabled at step 410 and the method continues at step 350 (FIG. 3), with the analysis of the next service in the service list. If the service is authorized for the device, then the method continues at step 345 (FIG. 3).

A criterion for the service being determined as being authorized for the device may, in certain embodiments, be such that the service that is in the list must inherently have, or must have been given, an authorized security layer that is identical to the identified security layer. When this criterion is used with step 405 and with step 505 described with reference to FIG. 5, the received security layer can be alternatively interpreted as a mode identifier that allows only those services that are of the mode identified by the security layer identifier to remain enabled.

Figure 5:
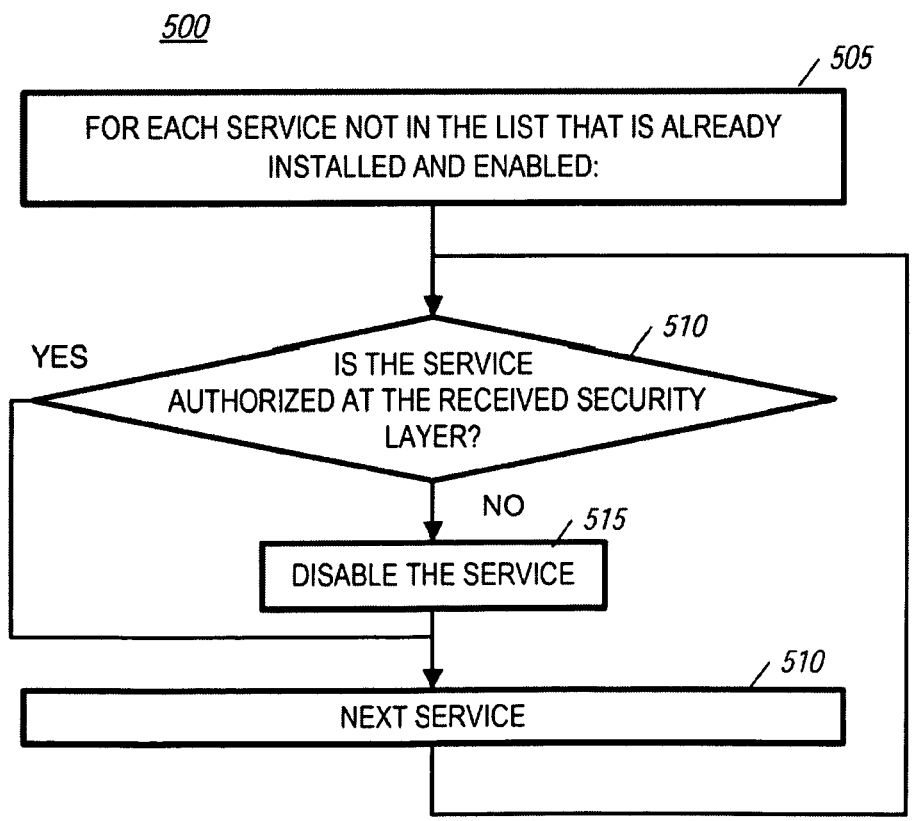

Referring to FIG. 5, a flow chart 500 shows some other steps of the method for managing a service list in a client device, in accordance with certain of the embodiments. These steps may be optional. For example, they may be used only in a client device in a public safety system. At step 505, which may be performed after steps 320-350 described with reference to FIG. 3, an analysis is started that is performed for each service that is already installed and enabled in the client device but that is not in the received service list. At step 510, a determination is made as to whether the service is authorized at the received security layer. If it is not, the service is disabled at step 515 and the method continues at step 520 with the next service not in the list but installed and enabled. If, at step 510, the service is determined to be authorized at the received security layer, the method continues at step 520 with the next service not in the list but installed and enabled.

The criterion for step 510 may be such that the service that is not in the list must have a security layer value that is equal to or greater than the security layer identified in the received service list. Alternatively, this determination may be referred to as a relative value comparison. This type of security layer value for a service may be termed a hierarchical identifier and may be used with security layers that are deemed to be hierarchical layers. In other embodiments described above with reference to FIG. 4, in which the step described with reference to FIG. 4 and the steps described with reference to FIG. 5 are both used, the received security layer can be interpreted as a mode identifier, and the criterion for step 510 may be whether the service that is not in the list inherently has a security layer value (a mode identifier) that is identical to the received security layer identifier. Alternatively, this determination may be referred to as an exact value comparison. In certain embodiments, the aspects of hierarchical layers and modes may both be used, by making certain evaluations on a hierarchical (relative value) basis and others on a mode (exact value) basis.

The determination as to whether a security layer value for a service is to be interpreted as a mode identifier, or as a hierarchical identifier may be established by, for example, ranges of security layer values for each service that are within one range when they are a mode identifier and in another range when they are a hierarchical identifier. In certain embodiments, when a security layer identifier is received with a service list, the services in the list should all be of the type (hierarchical or mode) that are identified by the security layer identifier. Services already installed and enabled that are not in the received list may then be evaluated according to the steps described with reference to FIGS. 5 and 8, further using a defined rule for a particular embodiment. For example, the rule may call for the use of the steps of FIGS. 5 and 8 only for services of one of the types (either hierarchical or mode) and leave the enablement state of services of the other type unchanged. Other embodiments are possible. For example, each service may be associated with both a hierarchical and mode identifier, and when a service list is received, the appropriate identifier type to be used for an evaluation is determined based on the security layer identifier type received with the service list. This is then used in the methods described above with reference to FIGS. 3-5.

Figure 6:
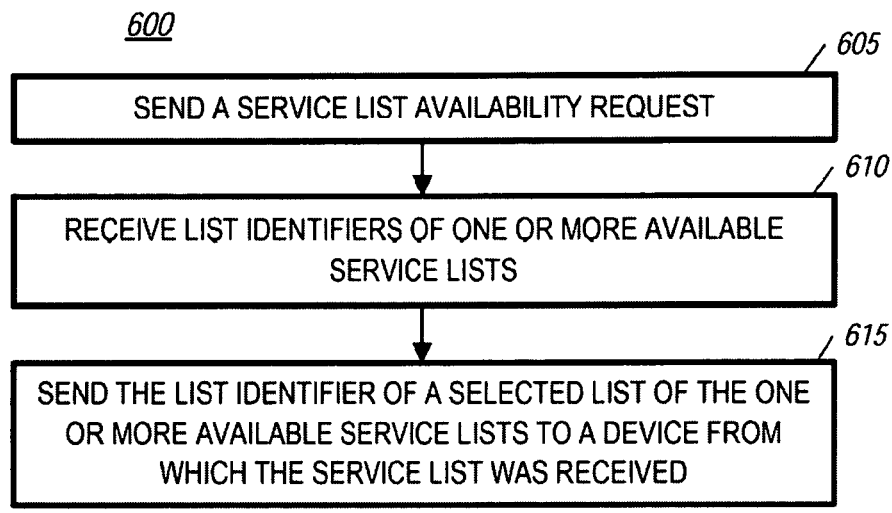

Referring to FIG. 6, a flow chart 600 shows some other steps of the method for managing a service list in a client device, in accordance with certain of the embodiments. These steps may be optional. At step 605, the client device, such as client device 120 (FIG. 1) sends a service list availability request. This request may be sent to a specific device, such as a server, and may request a particular type of service availability. For example, a user may send a service availability request to a server that provides services for several agencies, and the request may be for a specific agency, such as a fire department. In another example, a client device may send a service list availability request to a particular client device, or may be able to broadcast or multicast such a request to a set of client or server devices (for example, an ad hoc client group of which the client device has joined). At step 610 the client device receives a list of identifiers of one or more available service lists. Although these may be in response to the request made by the client device that has just been described, in some instances, they may have been sent irrespective of a request from the client device. For example, a list or lists of available services may be sent by a server to a client device in an unsolicited manner, when the client device has just become active in a particular system or group of users.

At step 615, which may be optionally used only when more than one identifier of available service lists has been received, the user sends a list identifier of a selected list to the device from which the list identifier was received, or in a more general case, to a device identified as having the selected available service list. As a result of this step, a service list and security layer identifier may then be received as described above at step 305 of flow chart 300, described above with reference to FIG. 3. Step 615 may also be used in certain embodiments to authorize a payment from the user of the client device.

Figure 7:
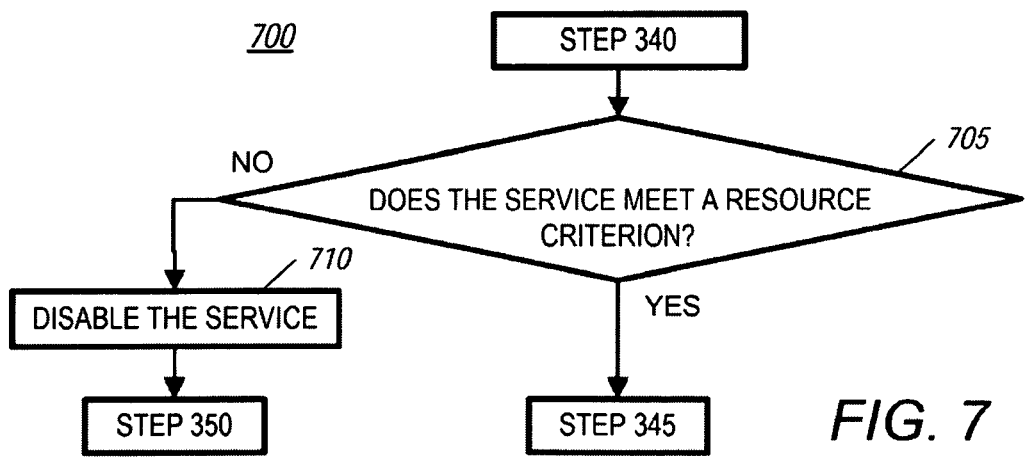
Figure 8:
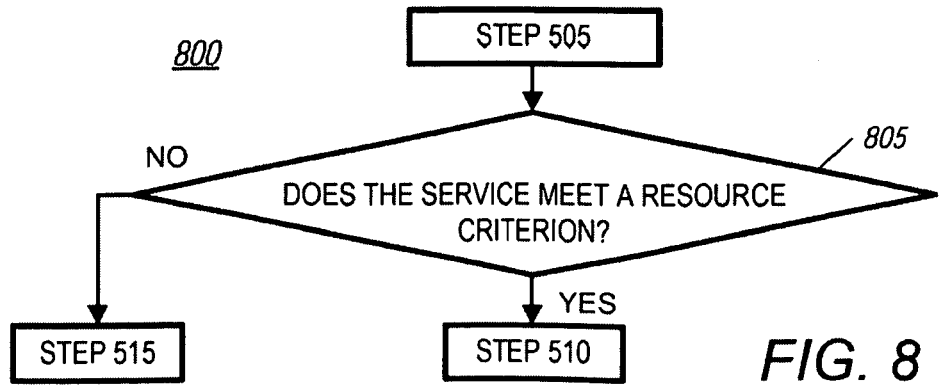

Referring to FIGS. 7 and 8, flow charts 700 and 800 show some other steps of the method for managing a service list in a client device, in accordance with certain of the embodiments. These steps may be optional. FIG. 7 may be added to the part of the method described with reference to FIG. 3 and FIG. 8 may be added to the part of the method described with reference to FIG. 5. In these steps, a determination is made at steps 705 (FIG. 7), 805 (FIG. 8) as to whether a service that is being analyzed meets a resource criterion, and if so, the respective portion of the method continues at steps 345 (FIG. 3), 510 (FIG. 5) without change. If, however, the criterion is not met, the particular service being analyzed is disabled at steps 710 (FIG. 7), 515 (FIG. 5) and the next service is then analyzed. Typically the steps shown in flow charts 500, 800 would be used or not used together. The criterion used to make the determination may be one that compares a resource value for the service being analyzed to a resource limit that is associated with a received security layer and established prior to the receipt of the security layer. The resource value for the service may be simply a single parameter, such as a measurement of average processor throughput, e.g., Million Instructions Per Second (MIPS), or memory requirements, or may be a single value associated with the service that was determined from a plurality of parameters (e.g., MIPS and memory), or may be a value calculated at the time of determination, using an established formula that uses a plurality of parameters associated with the service.

It will be appreciated that not all of the actions described in the above flow charts may need to be performed in the order shown. This aspect of such methods is well known to one of ordinary skill in the art. For example, the determination as to whether a service is authorized for the device, which was described above at step 405 (FIG. 4) could be made following step 325: ("Is the service installed in the device? NO") (FIG. 3) instead of following step, 340 (FIG. 3) which would avoid unnecessary downloading of those services which do not meet the criteria. However, this can only be done if the authorization of the service could be determined before the service was downloaded, which might not be true in all situations.

In certain embodiments, either or both of steps 340 (FIG. 3) and 515 (FIG. 5) may include locking the enablement state, thereby preventing the user from reversing the enablement state.

It will be appreciated that there could be a management function that is performed for devices that provide services such as those described above. This management function is the updating of programs in the device. In a particular embodiment, some or all of the programs being updated may fall under the definition of services. The updating function may update more than one program, and therefore more than one service. Such updating is distinct from the management of services as described herein above, with reference to FIGS. 1-8.

As just one example of the benefits of the above described embodiments, a client device that may be used by a public safety user for ordinary telephone and other incidental uses during non-emergency times may be provided a service list in response to an emergency situation, wherein the service list has a high priority. In accordance with the method described with reference to FIGS. 3, 4, and 5, the service list installs (as needed) and enables (as needed) a set of services specifically oriented to the emergency, and disables other services not appropriate for use during the emergency.

When used for hierarchical security layer based service management, a three layer security authorization is proposed, having a functional layer, an authentication layer, and a risk layer.

Examples of functional layer services are game services.

Examples of authenticated layer services are a) Police Service List (PTX to license check, PTX to Dispatch, PTX to Help, and PTX to Backup); b) School Service List (PTX to library, PTX to tutor, PTX to Help, PTX to Blackboard).

Examples of Risk Layer are a) Interconnect Service List (Set Call Forward, Set Interconnect, Emergency Service, and Set Mailbox); b) PTX Service List (Set PTX, Emergency PTX Service, and PTX counter).

When used for mode based service management, there may be several or many security layers (modes).

Thus, these embodiments may allow a government agency to use the provided system to provide users with emergency service lists that are tailored toward a specific emergency (e.g., biological attack, terror attack, tornado warning etc.).

Furthermore, these embodiments may allow a business to load PTX service lists (services) into mobile phones in a layer called "Authenticated Layer" in which the user is only able to use the services and is unable to share, modify or distribute the services. (The control for modification and sharing is provided by locking the enablement state at steps 340 (FIG. 3) and/or 515 (FIG. 5)). Service lists managers would be the only ones that could allow sharing, modification, or distributions. These services could be loaded on a temporary or permanent basis.

Furthermore, these embodiments may allow an individual to share services in sets/service lists and access specific PTX services based on the current environment.

It will be appreciated that although the bulk of this detailed description has been written to described client device embodiments, the concepts described herein can be used equally well with devices that may be considered other than client devices. In particular, they could be used in devices that are nodes of an ad hoc system or devices that are considered to be servers.

It will be appreciated that some embodiments may comprise one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the methods and/or apparatuses described herein. Alternatively, some, most, or all of these functions could be implemented by a state machine that has no stored program instructions, or in one or more application specific integrated circuits (ASICs), in which each function or some combinations of certain of the functions are implemented as custom logic. Of course, a combination of the approaches could be used.

Moreover, some of the embodiments can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as "being close to" as understood by one of ordinary skill in the art, and where they used to describe numerically measurable items, the term is defined to mean within 15% unless otherwise stated. The term "coupled" as used herein is defined as connected, although not necessarily directly and not necessarily mechanically. A device or structure that is "configured" in a certain way is configured in at least that way, but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims.

In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method, comprising:
   receiving at a device a service list and a security layer identifier, wherein the service list comprises at least two service identifiers and wherein the security layer identifier is a global value for all services in the service list;
   determining whether the security layer identifier corresponds to a global service security authorization value stored in the device; and
   for each service identified in the service list, when the security layer identifier corresponds to the global service security authorization value stored in the device:
      acquiring, by the device, each service in the service list that is not already installed in the device and
      enabling, by the device, each service in the service list that is not already enabled in the device.

2. The method according to claim 1, further comprising disabling a service that is: a) installed and enabled in the device before the service list is received and b) not identified in the service list that is received, the disabling being performed when a criterion that uses the security layer identifier is not met.

3. The method according to claim 2, wherein the security layer identifier is a hierarchical type, and wherein the criterion is a relative value comparison criterion.

4. The method according to claim 2, wherein the security layer identifier is a mode type, and wherein the criterion is an exact value comparison criterion.

5. The method according to claim 1, wherein the enablement of each service that is in the service list that is not already enabled in the device is dependent upon the service meeting a resource criterion.

6. The method according to claim 1, further comprising preventing a device user from disabling a service identified in the service list.

7. The method according to claim 1, further comprising linking a service to a service identifier of a user accessible version of the service list.

8. The method according to claim 1, further comprising:
   receiving list identifiers of one or more available service lists, each service list comprising service identifiers of at least two services; and
   sending the list identifier of a selected list of the one or more available service lists to a device from which the service list was received, wherein the selected list is the service list received at the device with the security layer identifier.

9. The method according to claim 7, further comprising, before receiving the list identifiers of one or more available service lists, sending a service list availability request to at least one external device.

10. A device, comprising:
   A processing system comprising one or more microprocessors; and
   a receiver coupled to the processing system that receives a service list and a security layer identifier, wherein the service list comprises at least two service identifiers, wherein the security layer identifier is a global value for all services in the service list, and wherein the processing system determines whether the security layer identifier corresponds to a global service security authorization value stored in the device, and for each service identified in the service list, when the security layer identifier corresponds to the global service security authorization value stored in the device:
- acquires each service in the service list that is not already installed in the device and
- enables each service in the service list that is not already enabled in the device.

\* \* \* \* \*